(12) United States Patent
Schwartz et al.

(10) Patent No.: US 7,577,705 B2
(45) Date of Patent: Aug. 18, 2009

(54) EXTENSIBLE COMMUNICATION CONTROLS

(75) Inventors: Jordan L. K. Schwartz, Seattle, WA (US); Sean O. Blagsvedt, Seattle, WA (US); Peyman Oriezy, Kirkland, WA (US); Paul R. Erickson, Sammamish, WA (US); Andrew F. Boardman, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 532 days.

(21) Appl. No.: 10/346,891

(22) Filed: Jan. 15, 2003

(65) Prior Publication Data

US 2004/0136511 A1 Jul. 15, 2004

(51) Int. Cl.
*G06F 15/16* (2006.01)
(52) U.S. Cl. .................. 709/206; 709/201; 709/203; 709/204
(58) Field of Classification Search .......... 709/206, 709/204, 201, 203
See application file for complete search history.

(56) References Cited

U.S. PATENT DOCUMENTS

| | | | |
|---|---|---|---|
| 6,185,184 B1 * | 2/2001 | Mattaway et al. | 370/230 |
| 6,275,490 B1 * | 8/2001 | Mattaway et al. | 370/352 |
| 6,430,604 B1 | 8/2002 | Ogle et al. | |
| 6,654,790 B2 * | 11/2003 | Ogle et al. | 709/206 |
| 6,874,126 B1 * | 3/2005 | Lapidous | 715/711 |
| 6,941,345 B1 * | 9/2005 | Kapil et al. | 709/206 |
| 2002/0027915 A1 * | 3/2002 | Foti et al. | 370/392 |
| 2002/0174199 A1 | 11/2002 | Horvitz | |
| 2004/0044736 A1 * | 3/2004 | Austin-Lane et al. | 709/206 |
| 2004/0056893 A1 * | 3/2004 | Canfield et al. | 345/753 |
| 2004/0155477 A1 * | 8/2004 | Lanigan et al. | 296/50 |
| 2004/0172456 A1 * | 9/2004 | Green et al. | 709/207 |
| 2005/0055405 A1 * | 3/2005 | Kaminsky et al. | 709/206 |
| 2007/0150552 A1 * | 6/2007 | Harris et al. | 709/218 |

FOREIGN PATENT DOCUMENTS

EP 0 744 689 B1 11/1996

(Continued)

OTHER PUBLICATIONS

Anantharaman, V., "Windows 95 Common Controls," *Dr. Dobb's Journal of Software Tools for Professional Programmer* 20(5):52-63, May 1995.

(Continued)

*Primary Examiner*—William C Vaughn, Jr.
*Assistant Examiner*—Djenane M Bayard
(74) *Attorney, Agent, or Firm*—Shook, Hardy & Bacon L.L.P.

(57) ABSTRACT

The present invention is directed to providing extensible and adaptable software communications controls for handling communication between devices. An extensible communications control is used to communicate between the computing device and a remote communications device. In a computing program that has been adapted to use the extensible communications control, information about a contact person is retrieved. From the retrieved contact information, it is determined what types of activities may be used to communicate with the contact person at the remote communications device. Once a communication activity has been determined from the contact person's information, a communication request is sent to a communication address associated with that communication activity. Upon acceptance the extensible communications control commences communication with the remote communications device.

35 Claims, 11 Drawing Sheets

FOREIGN PATENT DOCUMENTS

| EP | 1 139 631 A1 | 10/2001 |
| RU | 2073913 C1 | 2/1997 |
| WO | WO 92/05556 A1 | 4/1992 |
| WO | WO 0176172 A2 * | 10/2001 |

OTHER PUBLICATIONS

Cutrell, E., et al., "Notification, Disruption, and Memory: Effects of Messaging Interruptions on Memory and Performance," *Proceedings of 8th International Conference on Human-Computer Interactions (Interact 2001)*, Tokyo, Japan, Jul. 9-13, 2001, pp. 263-269.

Fong, A.C.M., et al., "Towards an Open Protocol for Secure Online Presence Notification," *Computer Standards and Interfaces* 23(4):311-324, May 2, 2001.

Gibson, S., and J.S. McCright, "Groove Smooths Connections," *eWeek*, Sep. 9, 2002, <http://www.eweek.com/article2/0,3959,522302,00.asp> [retrieved Sep. 10, 2002].

Glitho, R.H., et al., "A High Level Service Creation Environment for Parlay in a SIP Environment," *IEEE International Conference on Communications*, New York, Apr. 28-May 2, 2002, pp. 2008-2013.

"Groove Workspace and Microsoft SharePoint," *Groove Networks*, n.d., <http://www.groove.net/about/microsoft/sharepoint.html>, available at least as early as Sep. 10, 2002.

Meier, C., "Communication Management or 'How to Use Presence Information,'" *ComTec* 80(4):9-13, Apr. 2002.

"Microsoft's Real-Time Communications Platform Takes Shape in Windows XP, Windows .NET Server," *PressPass*, Oct. 17, 2001, <http://www.microsoft.com/presspass/features/2001/oct01/10-17rtc.asp> [retrieved Oct. 10, 2002].

Riordan, J., "Unified Communications," *ComTec* 80(2):33-7, Feb. 2002.

Schulzrinne, H., and J. Rosenberg, "The IETF Internet Telephony Architecture and Protocols," *IEEE Network* 13(3):18-23, May-Jun. 1999.

Smith, T., "Notes Users Get Into a Collaborative Groove," Internetweek.com, n.d., <http://www.internetweek.com/breakingNews/INW20020819S0007> available at least as early as Sep. 10, 2002.

Tsang, S., et al., "Accessing Networked Appliances Using the Session Initiation Protocol," *International Conference on Communications*, Helsinki, Finland, Jun. 11-14, 2000, pp. 1280-1285.

Wullert II, J.R., et al., "Presence Management in Next Generation Networks," *Proceedings of SPIE—The International Society for Optical Engineering*, Denver, Colorado, Aug. 21, 2001, pp. 69-75.

\* cited by examiner

EXTENSIBLE COMMUNICATION CONTROLS

FIELD OF THE INVENTION

The present invention relates in general to network communications and in particular to application embeddable controls for communication over networks

BACKGROUND OF THE INVENTION

Communication networks are well known in the computer and telephony communications fields. By definition, a network is a group of computers and/or devices connected by communications facilities or links. Network communications can be of a permanent nature, such as via cables, or can be of a temporary nature, such as connections made through telephone or wireless links. Networks may vary in size, from a local area network ("LAN"), consisting of a few computers or workstations and related devices, to a wide area network ("WAN"), which interconnects computers and LANs that are geographically dispersed, to a remote access service ("RAS"), which interconnects remote computers via temporary communications links. An internetwork, in turn, is the joining of multiple computer networks, both similar and dissimilar, by means of gateways or routers, that facilitate data transfer and conversion from various networks. A well-known abbreviation for the term internetwork is "internet." As currently understood, the capitalized term "Internet" refers to the collection of networks and routers that use the Internet Protocol ("IP"), along with higher level protocols, such as the Transmission Control Protocol/Internet Protocol ("TCP/IP") or the Uniform Datagram Packet/Internet Protocol ("UDP/IP"), to communicate with one another.

The Internet has recently seen explosive growth by virtue of its ability to link computers and devices located throughout the world. Other interactive environments may include proprietary environments, such as those provided by the Microsoft Network ("MSN") or other online service providers, as well as the "wireless Web" provided by various wireless networking providers, especially those in the cellular phone industry. As will be appreciated from the following description, the present invention could apply in any such interactive environments; however, for purposes of discussion, the Internet is used as an exemplary interactive environment for implementing the present invention.

The Internet has quickly become a popular method of communicating due in large part to its ability to deliver information in a variety of formats. To communicate information over the Internet, a user typically executes a communications program that communicates with other communications programs executing on remote computers that are also connected to the Internet. These conventional communications programs generally utilize a single communications protocol associated with the type of communications program. For example, a video communications program would use a proprietary video communications protocol, and a text chat program would use a proprietary chat communications protocol. Different types of communications protocols are often specific to particular communications programs. Therefore, a textual chat program from one software provider would not necessarily utilize the same chat protocol that a chat program from another software provider would use. Such a proprietary communications environment has led to a myriad of different types of communications and within those types of communications a myriad of different protocols for enabling each type of communication.

Another result of the diversified communications application environment is that as best practices are discovered by a particular software developer and implemented in their communications program, only that communications program benefits from these best practices. Other software developers would need to each individually update their software if it was desired to implement a newly developed "best practice."

Another drawback with current communications programs is that each application program generally stores contact information only for other users of that particular communications program. Accordingly, when trying to reach a particular user who may be online utilizing a communications program, the process of contacting the user is generally a trial and error process until the correct communications application is located. Furthermore, contact information needs to be reentered for each separate communications program.

A still further drawback of conventional communications programs is that they are generally separate from other applications used in computing environments. For example, while it is possible to concurrently run a video conference and a word processing application, it is generally difficult to run a collaborative word processing session that would include a video communications component in the same application. It is possible to design such applications, however, this capability is equivalent to designing a communications application and a word processing application and then creating the necessary integrations manually. Such manual creations are of a single purpose (e.g., word processing and video conferencing, word processing and text chat, or game play and audio chat). These manual creations are not extensible (e.g., they cannot be updated, modified, or substituted as modular components) and suffer from the drawbacks of maintaining separate contacts. Also, as new types of communications became available, it would be necessary to update such hybrid communications applications manually to include new types or combinations of types of communication.

Accordingly, there is a need for a more flexible and extensible communications environment. It would be desirable to have in a new communications environment the ability to dynamically define a protocol and/or communication type given contact information for a particular user. It would further be desirable to be able to obtain best practices for communications applications in such a manner that all applications adapted to use communications would receive the best practices whenever any communication application obtains them.

SUMMARY OF THE INVENTION

The present invention is directed to providing extensible and adaptable software communications controls (program components) for handling communication between devices. In one aspect of the present invention, an extensible communications control is used to communicate between the computing device and a remote communications device. In a computing program on the computing device that has been adapted to use the extensible communications control, information about a contact person is retrieved. From the retrieved contact information, it is determined what types of activities may be used to communicate with the contact person at the remote communications device. Contact activities include not only a contact person's communication address, but also what type of communication and potentially what communications program should be used when communicating. Once a communication activity has been determined from the contact person's information, a communication request is sent to a communication address associated with that communication activity. Assuming that the communication request is accepted, then the extensible communications control can then commence communication with the remote communications device.

In some embodiments of the present invention, it is possible for the communication activity to not specify a particular communications program, rather the remote communications device determines a default program with which to communicate. In another exemplary embodiment of the present application, the default program is a shell program housing an extensible communications control. The communication between devices may be any of a myriad of communication types, including but not limited to, text chats, instant messages, video conferencing, audio conferencing and the like. These communications may take place over conventional computing networks and other types of networks, such as telephone networks.

In another aspect of the present invention, the communications device and computing device do not communicate in a peer-to-peer fashion. Accordingly, a separate "conversation" is created that both devices contact at an intermediary location in which to communicate. Such a conversation would be labeled with an identifier such that the computing device and the remote communications device could communicate with the other once both have used the conversation identifier to connect to the conversation.

In still another aspect of the present application, the extensible communications control is an adaptable module that can be used by many types of programs including, but not limited to, communications programs. This aspect of the extensibility of the present invention allows programs to specify that a communications control should be used, but the control may then be directed to provide different communication services as needed or desired. These programs can extensibly specify what types of communications, protocols, addresses, and configurations should be used by the extensible communications control. As in this aspect of the present invention, the extensible communications control is a module that is responsive to applications adapted to use it, and the extensible communications control may be detached from one program and attached to another program. In one such embodiment, a detachment and attachment would break the communications connection but reattach it once the extensible communications control has been attached to another program. In an alternate embodiment of the present invention, communication could continue even after the extensible communications control has been detached from one program and while it is being transferred to be attached to another program.

In yet further aspects of the present invention, the extensible communications control may be adapted to communicate with either non-computing devices or computing devices as remote communications devices. Accordingly, in one embodiment, the remote communications device may also include a program responsive to communications requests from an extensible communications control. Such a program on a remote communications device may determine from a received communication request any extensible communication activities and activate one or more communications program on the remote communications device to communicate using such extensible communication activities.

As can be seen from the summary above, the present invention provides for an extensible and adaptable communication environment for providing communications between devices along with a computer-readable medium and system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The detailed description which follows is represented largely in terms of processes and symbolic representations of operations by conventional computer components, including a processor, memory storage devices for the processor, connected display devices, and input devices. Furthermore, these processes and operations may utilize conventional computing components in a heterogeneous distributed computing environment, including remote file servers, computer servers, and memory storage devices. Each of these conventional distributing computing components is accessible by the processor via a communications network.

The present invention is directed to providing communications between extensible communications controls in computing and non-computing network environments. An extensible communications control is used to communicate between a computing device 200 and a remote communications device 150. The computing device 200 has at least one computing program that has been adapted to use an extensible communications control in accordance with the present invention. This communications control may then be used to communicate with other devices in the network, such as a communications device 150. The details of such communications and the interrelations between communications controls, programs that have been adapted to use communications controls, and devices will be explained in greater detail below. The at least one computing program specifies extensible communication activities (discussed in greater detail below) with an extensible markup language (XML).

Figure 1:
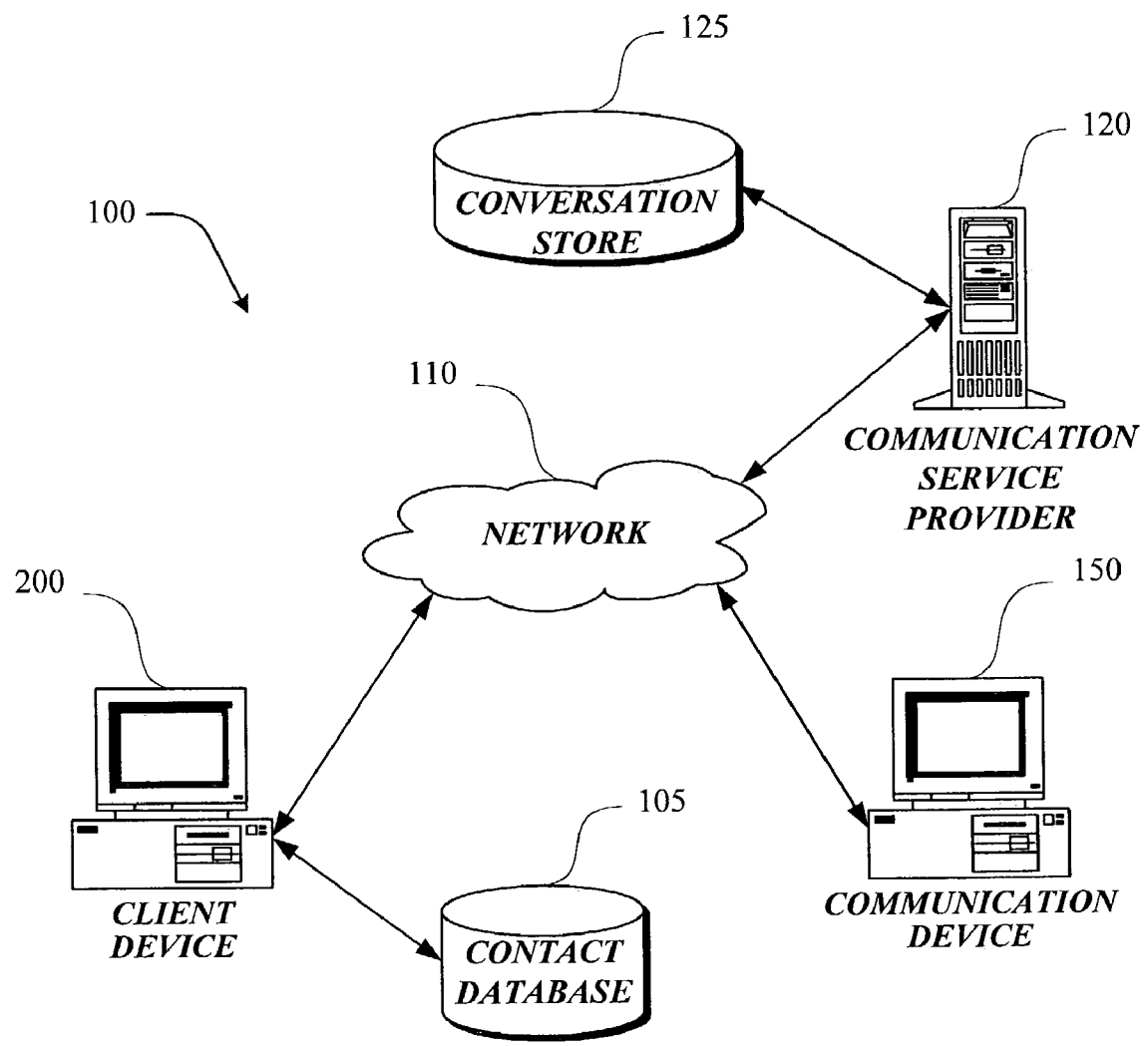
FIG. 1 is a pictorial diagram of a number of devices connected to a network which provide a communications connection between devices in accordance with the present invention.

As previously explained, the capitalized term "Internet" refers to the collection of networks and routers that use communications with one another. FIG. 1 illustrates a functional block diagram of a communications system 100 for providing communications connections between devices. While the system 100 generally operates in a distributed computing environment comprising individual computer systems interconnected over a network 110 (such as the Internet), it will be appreciated by those of ordinary skill in the art that the system 100 could equally function in non-computing networks such as the POTS (Plain Old Telephone System) network as further described below. The system 100 shown in FIG. 1 includes a client device 200, a contact database 105, a communications device 150, a communication service provider 120 and a conversation store 125 all interconnected via a network 110. Client device 200 has computing capabilities and may be any form of device capable of processing the routines of the present invention. Communications device 150 may also be a computing device or a simpler device such as a telephone. It will be appreciated by those of ordinary skill in the art that the conversation store 125 and the contact database 105 may reside on any device accessible by the client device 200 shown in communications system 100. An exemplary computer client device 200 is shown in further detail in FIG. 2 and described below. Additionally, while only a single client device 200 and a single communications device 150 have been shown, it will be appreciated that more client devices 200 and/or communications devices 150 may be included in the system 100. Client device 200 may also be referred to as an originating device, and communications device 150 may be referred to as a contact device.

Figure 2:
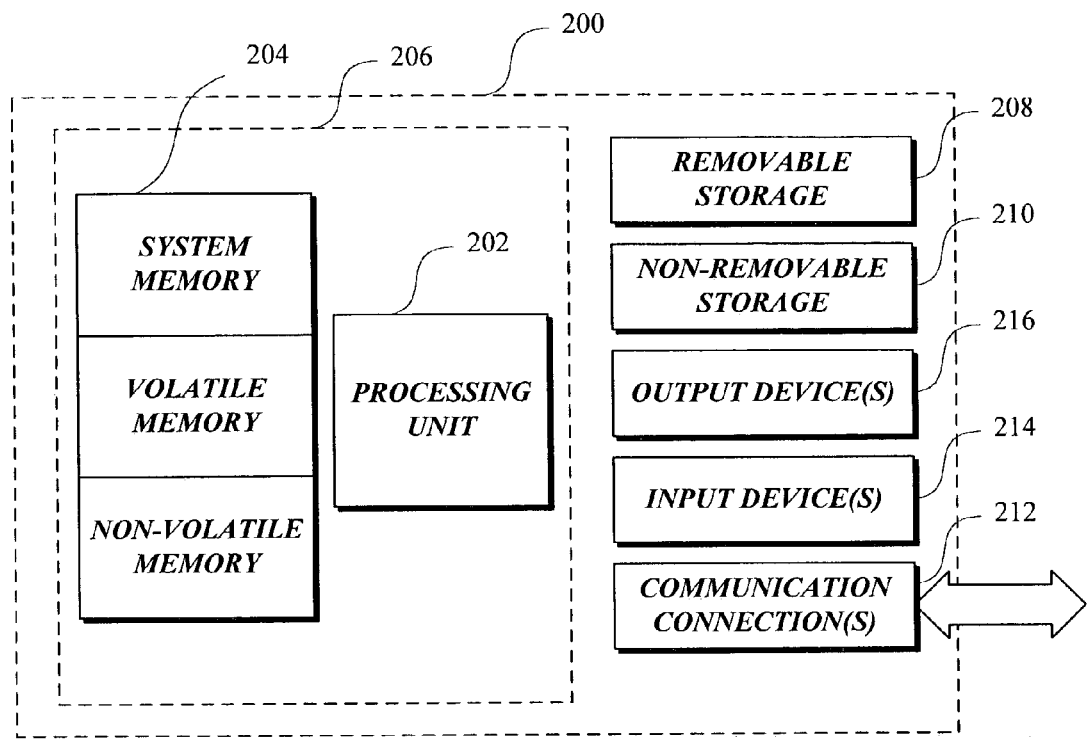
FIG. 2 is a block diagram of a communications device such as a computer which enables communication connections in accordance with the present invention.

FIG. 2 illustrates an exemplary client device 200 for implementing hereinafter described aspects of the present invention. In its most basic form, the client device 200 typically includes at least one processing unit 202 and memory 204. Depending on the exact configuration and type of client device, memory 204 may be volatile (such as RAM), nonvolatile (such as ROM, flash memory, etc.), or some combination of the two. This most basic configuration is illustrated in FIG. 2 by dashed line 206. Client device 200 may also have additional features/functionality. For example, device 200 may also include additional storage (removable and/or non-removable) including, but not limited to, magnetic or optical disks or tape. Such additional storage is illustrated in FIG. 2 by removable storage 208 and nonremovable storage 210. Computer storage media includes volatile and nonvolatile, removable and nonremovable media implemented in any method or technology for storage of information such as computer readable instructions, data structures, program modules, or other data. Memory 204, removable storage 208, and nonremovable storage 210 are all examples of computer storage media. Computer storage media includes, but is not limited to, RAM, ROM, EEPROM, flash memory, or other memory technology, CD-ROM, digital versatile disks ("DVD"), or other optical storage, magnetic cassettes, magnetic tape, magnetic disk storage or other magnetic storage devices, or any other medium which can be used to store or read desired information and which can be accessed by the client device 200. Any such computer storage media may be part of client device 200.

The computer storage media of the client device 200 also contains computer programs and/or routines suitable for communicating with and processing information from remote computers, such as communication service provider 120, and remote client devices 200.

Client device 200 may also contain a communications connection 212 that allows the device to communicate with other devices. Communications connection 212 is an example of communication media. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example and not limitation, communication media includes wired media such as a wired network or direct wired connection and wireless media such as acoustic, radio frequency, infrared and other wireless media. The term "computer-readable media" as used herein includes storage media, communication media, and any other computer-readable media known to those skilled in the art.

Client device 200 may also have input device(s) 214 such as keyboard, mouse, pen, voice input device, touch input device, etc. Output device(s) 216 such as a display, speakers, printer, etc., may also be included. Since all these devices are well known in the art, they are not described here.

Figure 3:
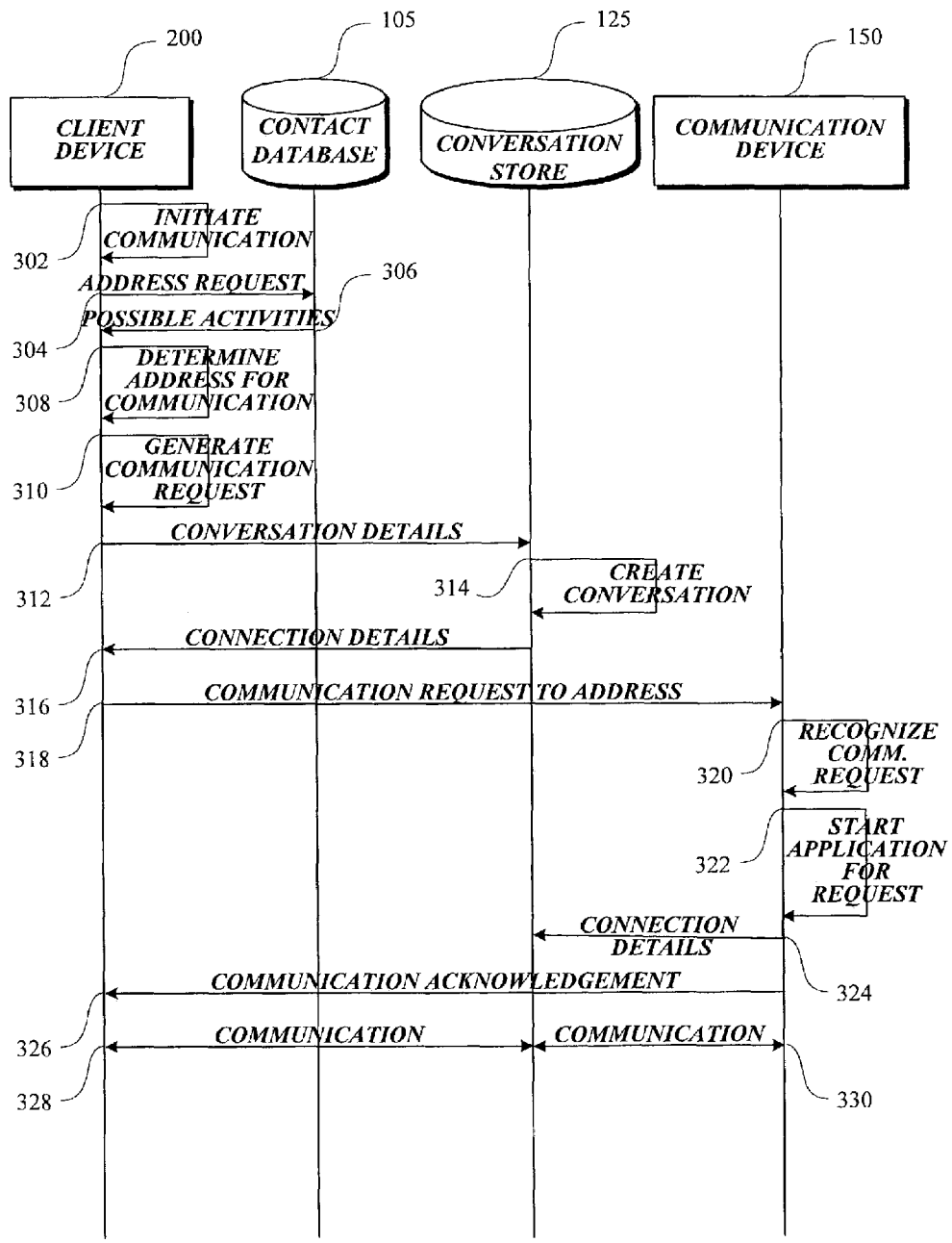
FIG. 3 is a diagram illustrating the actions taken by a client device, a contact database, a conversation store, and a communications device to provide for a communication connection in accordance with the present invention.

To illustrate the operation of the communications controls formed in accordance with this invention, FIG. 3 illustrates one sequence of interactions between devices and the communications system 100 shown in FIG. 1. The devices of system 100 illustrated in FIG. 3 include the client device 200 and the communications device 150 along with a contact database 105 and a conversation store 125. The interactions of and the routines performed by the various devices are illustrated and described in greater detail with reference to FIGS. 4-7.

Figure 6:
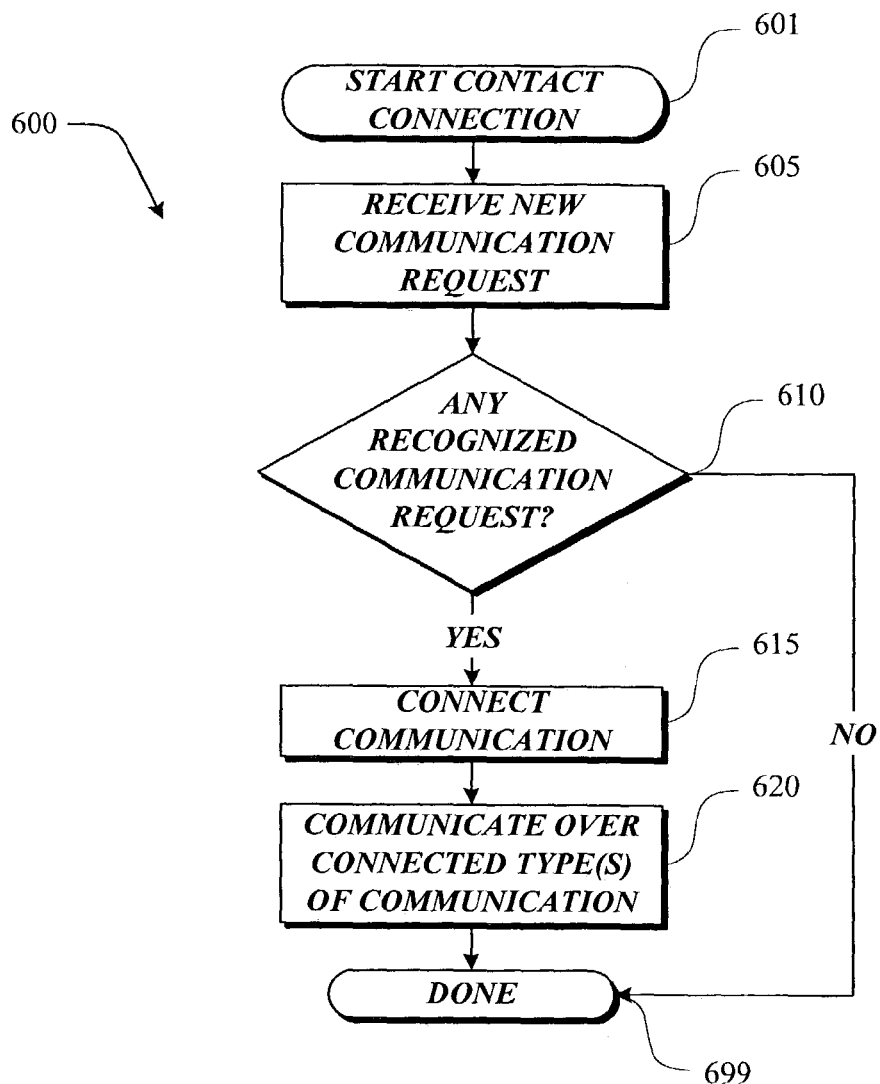
FIG. 6 is an overview flow diagram illustrating a contacts connection routine for forming a communication connection in accordance with the present invention.

As can be seen from the above discussion of communication between devices of the present invention, much of the communications processing is handled by the client device 200. In further aspects of the present invention, the communications device 150 may be a less sophisticated device than the client device 200. For example, when using a type of audio communication telephony, it would be possible for the client device 200 to initiate a communication request to a communications device 150 that was a telephone. This would be accomplished by having the definitions of the telephony protocols that are needed to communicate with a telephone and the necessary address (i.e., telephone number) to reach a particular contact at their communications device (i.e., telephone). FIG. 6 below illustrates the simplified processing that might go into a simple contact communications device 150's interaction with a more sophisticated client device 200.

Returning to FIG. 3, communications connection and processing is initiated when a client device 200 initiates a new communication "activity" 302. The new communication activity 302 will require contact information, which in this exemplary interaction is obtained using an address request 304 to a contact database 105. The address request 304 sent to the contact database 105 includes information about the initiated communication including the types of communication that may be desired and any preferred protocols and/or communication details sent by the client device 200. The contact database 105 then determines which addresses, if any, meet the requirements sent by the address request. For example, if both a video request and a text chat request were indicated in the address request sent to the contact database 105, then the contact database 105 would return possible activities 306 that match the types of video and text chat requirements of the address request 304.

Figure 5:
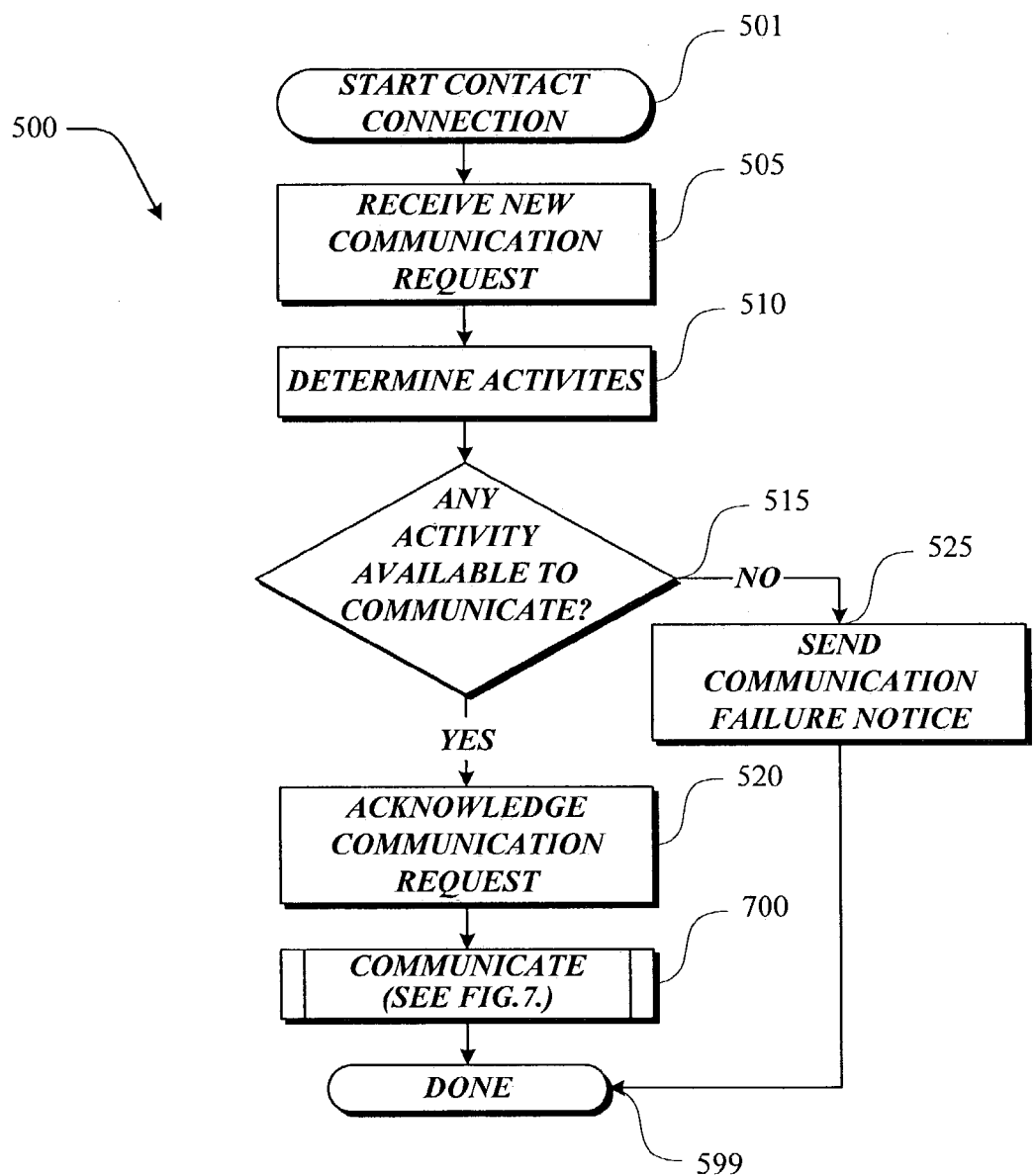
FIG. 5 is an overview flow diagram illustrating a contacts connection routine for forming a communication connection in accordance with the present invention.

The concept of an "activity" includes the following pieces: an address, a communication type, and optionally, a communications program, service provider, and/or protocol. The address is used to determine where to send an invitation to communicate using the activity. The communication type is used to determine what type of communication invitation to initiate at the receiving end. If a service provider is included, that may also include information on where to send the activity invitation initially (e.g., possibly sending the invitation to the service provider to then forwarding to the contact's address). The inclusion of a specific communication program (or program with an embedded extensible communications control) gives a further indication of where to direct an activity invitation to a communications device 150. If the communications device 150 has not loaded the specified program(s), then the invitation would cause the program(s) to be loaded, or at least an indication of what program(s) to load would appear on the communications device 150. In one exemplary embodiment, the contact device 150 includes a program for handling such invitations. One exemplary flow diagram for such a program is shown in FIG. 5 and described below. If a communications program for the communication type may use a number of protocols, then by specifying a protocol in the activity, the correct protocol would be used in a communication invitation.

In one exemplary scenario, if a text chat activity for the contact is a UNIX "talk" session then the user name and host name of the UNIX computer are returned along with the indication that a UNIX talk protocol is needed to contact the contact person at the user name and host name. Of course, more than one type of activity may be available for a particular contact, and accordingly, multiple types of addresses and protocols may be returned 306. Those of ordinary skill in the art will appreciate that many types of activities are possible and compatible with the present invention. Further, in one aspect of the present invention, the definition of activity is extensible by the client devices. Further illustrative examples will be understood from the description below.

Next, client device 200 determines 308 an address or addresses and protocols to use to contact the contact at the communications device 150. For example, if either the contact or the user of the client device 200 has indicated a preference for a particular type of activity even though multiple types are available, this preference may be communicated back with the addresses and the preferred type of activity would be selected if usable by both parties. The determination process 310 may be performed exclusively on the client device 200 or the determination process 308 may also include interactions with other devices to determine if the contact is currently available at a particular address using a particular type of communication. For example, with some instant messaging text chat systems the users and contacts broadcast an indication of when they are available for chatting. Therefore, determining which addresses to use for communication may further include determining at which address or addresses the contact may currently be online.

Once addresses, protocols and possibly specific communications programs have been determined 308 then a new communication request or requests (if multiple types of communication are desired) is generated 310. In the interaction shown in FIG. 3, there is non-peer-to-peer communication that has an intermediary service via which the actual communication with the contact will take place. Therefore, the client device 200 provides conversation details 312 to a conversation store 125. The conversation store 125 is a virtual meeting place where the client device 200 and the communications device 150 may meet and process their communications in a "conversation". Those of ordinary skill in the art will appreciate that the conversation store 125 may reside on a communication service provider 120, on the client device 200, on the communications device 150, or on still further devices known to those of ordinary skill in the art. A conversation, as used in the present invention, is any communication that invokes an intermediary service that hosts communication in an environment that is not peer-to-peer in nature. Once the conversation details 312 have been sent to the conversation store 125 then a conversation is created 314 at the conversation store. A conversation confirmation 316 is then returned to the client device 200 giving details for connecting to the created conversation.

Next, a communication request 318 is sent out to the address that had been located for the contact earlier. This communication request (invitation) 318 is sent, in this embodiment, to the communications device 150 that corresponds to the communication address. Once the communications device 150 receives the communication request, it recognizes 320 activity of the communication request. If the invitation is accepted, the communications device starts an application 322 that corresponds to the specified activity of the communication request. For example, a communication request 318 may specify a particular application either by name or through some other indication (e.g., protocol, file type, communication type, etc.) as part of the activity specified in the communication request. Alternately, the communications device 150 may have a default application for processing particular activities. Once the application has started 322 on the communications device 150 then connection details 324 are sent back to the conversation store 125, thereby connecting the communications device 120 to the conversation store 125. Additionally, a communication acknowledgement 326 may be sent directly back to the client device 200. Those of ordinary skill in the art and others will appreciate that joining in a communication at the conversation store 125 may be a sufficient communication acknowledgement and that in some embodiments of the present invention no additional communication acknowledgement 326 is sent back to the client device 200. Once both the client device 200 and the communications device 150 have all the connection details for connecting to the conversation store 125, then they may proceed with communication with each other 328, 330 via the conversation store 125.

Those of ordinary skill in the art and others will appreciate that the conversation store 125 may include any of a myriad of intermediary communication programs known to those in the art. Communication stores 125 may be present in video conferencing reflectors, text chat server applications, audio chat server applications, and the like.

It will also be appreciated by those of ordinary skill in the art that FIG. 3 represents only one exemplary set of interactions between the devices of system 100. Therefore, additional configurations of devices and connections may be included in other such interactions. The interactions of FIG. 3 are merely meant to be illustrative to assist in understanding the present invention and are not meant to be limiting as to the present invention's scope.

Figure 4:
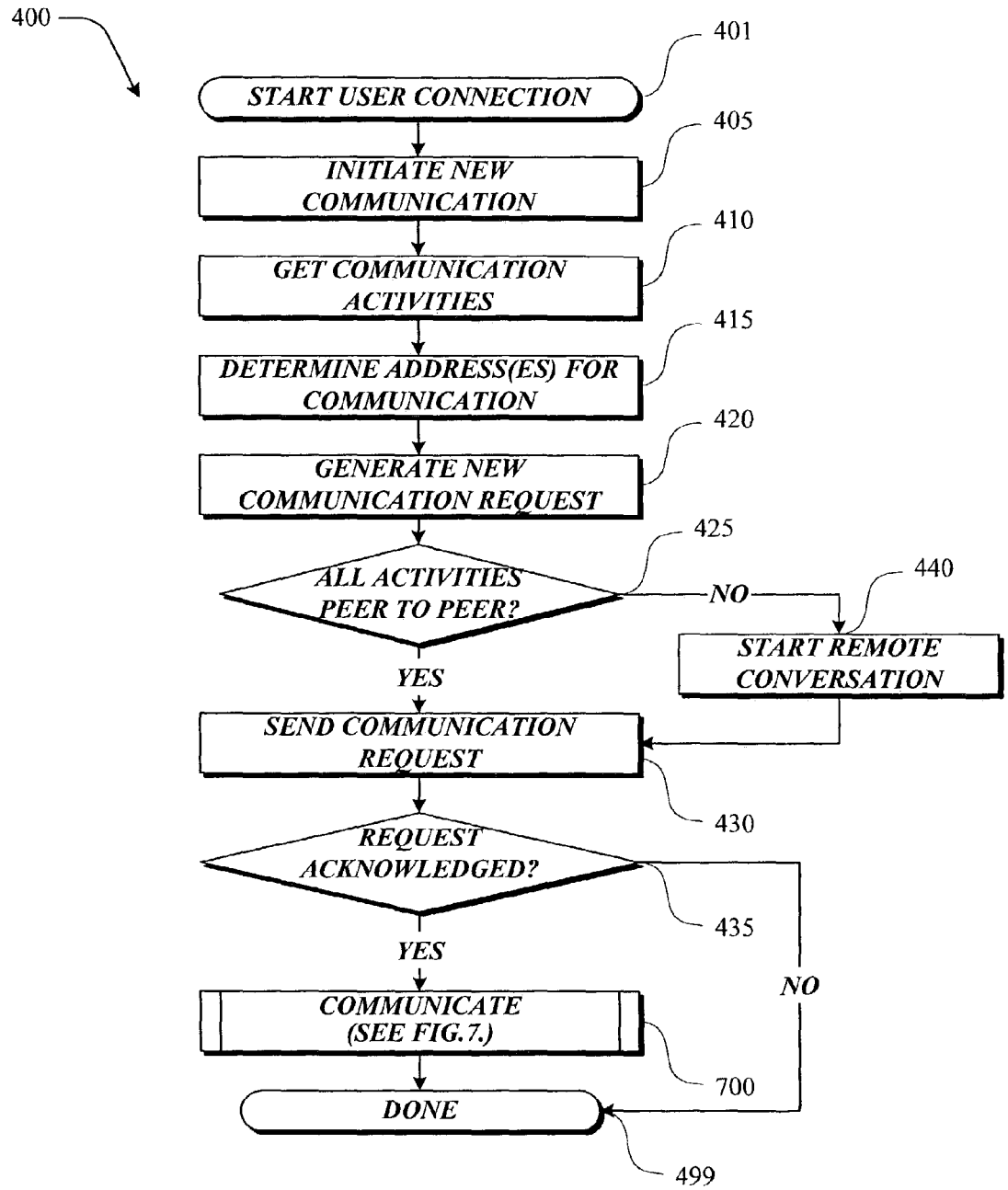
FIG. 4 is an overview flow diagram illustrating a communication connection routine implemented by a communications device to provide a communication connection in accordance with the present invention.

As illustrated in FIGS. 1, 2, and 3, the embodiment of the communications system 100 described herein includes a client device 200 that is used to initiate communications and process them. A flowchart illustrating a user connection routine 400 for communications initiating from a client device 200, in accordance with one embodiment of the present invention, is shown in FIG. 4. The user connection routine 400 begins at block 401 and proceeds to block 405 where a new communication is initiated. Next in block 410, routine 400 obtains possible communication activities for a contact person. These activities may be manually input by a user, obtained from a local contact database 105 or obtained from a remote location such as a company-wide directory or a search engine and the like.

In one exemplary embodiment of the present invention, the contact database 105 contains a name, mailing addresses, email addresses, real-time addresses, etc., but it does not store a mapping between real-time addresses and activities. The user chooses a contact to communicate with and chooses an activity, and the client device 200 figures out which of the contact's addresses to use to realize that activity via some particular service provider available from the client device 200. In alternate embodiments of the present invention, a contact record could indicate a preferred address for an activity. In still another embodiment the preferred address may be stored elsewhere, e.g. in a "per user task preference database" that is only loosely linked with the contact record, in a system-wide preference shared-by-all-users, or determined on the fly based on a user's presence setting (e.g., online via cell phone, on-line via broadband connection, on-line at work, on-line at home, etc.).

Next in block 415, a determination is made which address or addresses and applications should be used for communicating with the contact person. As noted above, determining an address or addresses for communicating with a contact person may be performed in a variety of manners. However, in one exemplary embodiment of the present invention, all activities available from a contacts database 105 for a particular contact person are retrieved in block 410 and are then compared with the new communication that was initiated in block 405 to determine if any are appropriate address and communication type combinations for communicating with a communications device 150 associated with the contact person.

Figure 7:
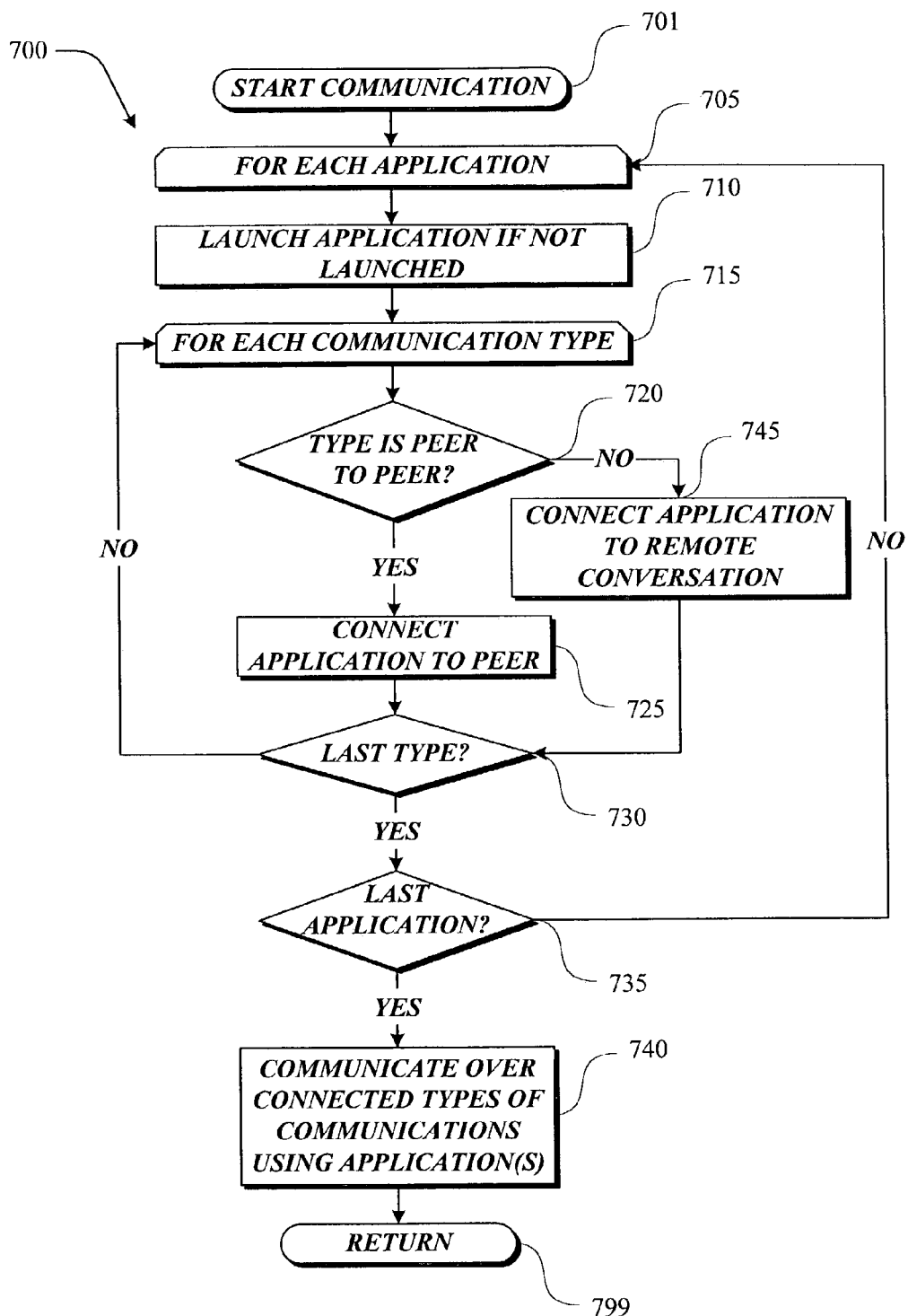
FIG. 7 is an overview flow diagram illustrating a communication connection subroutine for establishing and communicating over a communications connection in accordance with the present invention.

Once an address or addresses have been determined along with any associated communication types and other activity information, then in block 420 a new communication request including at least one activity is generated. In decision block 425 a determination is made whether all the activity or activities are peer-to-peer (e.g., no intermediary devices participate or manage the communication) in nature. If all the activities are peer-to-peer, then the communication requests can be sent immediately to the communications device 150 in block 430. If, however, it was determined in decision block 425 that not all of the activities are peer-to-peer (e.g., there is at least one intermediary device that participates in or manages the communication) then processing continues to block 440 where a remote conversation is started after which the communication request is sent in block 430. Next, a determination is made in decision block 435 whether a request was acknowledged. If no request was acknowledged then routine 400 ends at block 499. If, however, at least one activity of the communication request was acknowledged then processing may continue to subroutine block 700 where communication commences between devices. The communication subroutine 700 is shown in FIG. 7 and described in detail below. Once communication subroutine 700 returns, then routine 400 ends at block 499.

As illustrated in FIGS. 1 and 3, the embodiment of the communication system 100 described herein includes a communications device 150 that is used by a contact person to communicate with a client device 200. As already noted, the communications device 150 may be a computing device much like client device 200 or it may be a much simpler communications device such as a telephone. Accordingly, FIGS. 5 and 6 illustrate exemplary communication connection routines from a contact person's perspective using a communications device 150.

FIG. 5 illustrates an exemplary communications connection routine 500 utilizing a communications device 150 that includes the ability to execute computing applications and is comprised of components similar to those at client device 200. Communicating connection routine 500 may be embodied in a resident process on a communications device 150 for handling incoming communication requests. Such a resident process may also communicate the status of a communications device 150 so that users wishing to communicate with the contact person will be aware of the contact person's current status.

Contact communications connection routine 500 begins at block 501 and proceeds to block 505 where a new communication request is received. Next, in block 510 determination is made as to what types of activities are embodied in the communication request. Once the requested activities have been determined in block 510, then in decision block 515 a determination is made whether any determined activities are available such that program(s) on the communications device 150 may respond to the communication request. If so, then in block 520 the communication request is acknowledged. Communication commences at subroutine block 700. Subroutine 700 is illustrated in FIG. 7 and described below. Once communication subroutine 700 returns, then routine 500 ends at block 599. If, however, in decision block 515 it was determined that there were no activities available to communicate in response to the communication request, then in block 525 a communication failure notice is sent back to the client device 200 and processing ends at block 599.

FIG. 6 also illustrates a contact communications connection routine. However, the contact communications connection routine 600 illustrated in FIG. 6 is for a same communications device 150 such as a telephone, radio, pager or the like that may not be able to execute computing routines in response to a communication request. Accordingly, routine 600 begins at block 601 and proceeds to block 605 where a new communication request is received. Next, in decision block 610 a determination is made whether the communication request is recognized. If so, then in block 615 the communication is connected. Communication then commences using the recognized type of communications from the communications request in block 620. After communication ends at block 620, then routine 600 ends at block 699. If in decision block 610 no type of communication was recognized then again routine 600 ends at block 699.

Those of ordinary skill in the art and others will appreciate that by using an extensible communications control on the client device 200 it is possible to provide a number of different types of communications within an extensible communications control. This communications control may be incorporated into other computing programs in a client device 200 (and in more advanced communications devices 150). The control may be incorporated when a program is developed such that when executed the control may be directed as to the type of communication to use when contacting other devices. This placeholder design allows for more flexibility in computer programs and allows the communications control to be upgraded and improved as desired. As particular communications devices 150 are developed as devices for which communications may be desired, it is possible to define new protocols and tailor communication requests such that they will be recognized by both the communications connection routine 400 and the contact connection routine 500 and/or 600. For example, an audio chat communications control adapted to send a digital signal for an audio chat program on a communications device 150 may be adapted instead to send a telephony audio signal to a telephone communications device 150 such that the signals provided by a telephone communications device 150 will be recognized by an adapted communications control on a client device 200 (e.g., ring tones, busy signals, hang-ups, touch tones, dial tones, etc.).

As noted above, FIG. 7 illustrates an exemplary communication subroutine 700. Exemplary communication subroutine 700 begins at block 701 and proceeds to looping block 705 which iterates through all applications that are part of a communications connection (either specified applications or default applications for communication type). So for each application, if it has not been launched then in block 710 the application is launched. Next, in looping block 715, for each communication type that the current application utilizes, a determination is made whether the connection is a peer-to-peer communication. If so, then in block 725 the application is connected to its peer device (e.g., the client device 200 or the communications device 150). If in decision block 720 it was determined that the communication type is not peer-to-peer then processing continues to block 745 where the application is connected to a remote conversation at a conversation store 125.

After block 745 or 725, another determination is made in decision block 730 whether this is the last type of communication for the current application. If it was found in decision block 730 that this was not the last type of communication, then processing loops back to looping block 715. If, however, in decision block 730 it was determined that this was the last type of communication for the current application then processing continues to decision block 735 where determination was made whether this was the last application. If not, then processing loops back to looping block 705 where the next application becomes the current application. If, however, in decision block 735 it was determined that this was the last application, then processing proceeds to block 740 where communication over the connected types of communication using all the applications associated with the communication types proceeds. Once communication ends such as by either the communications device and/or the client device, then subroutine 700 returns at block 799 to its calling routine.

Figure 8:
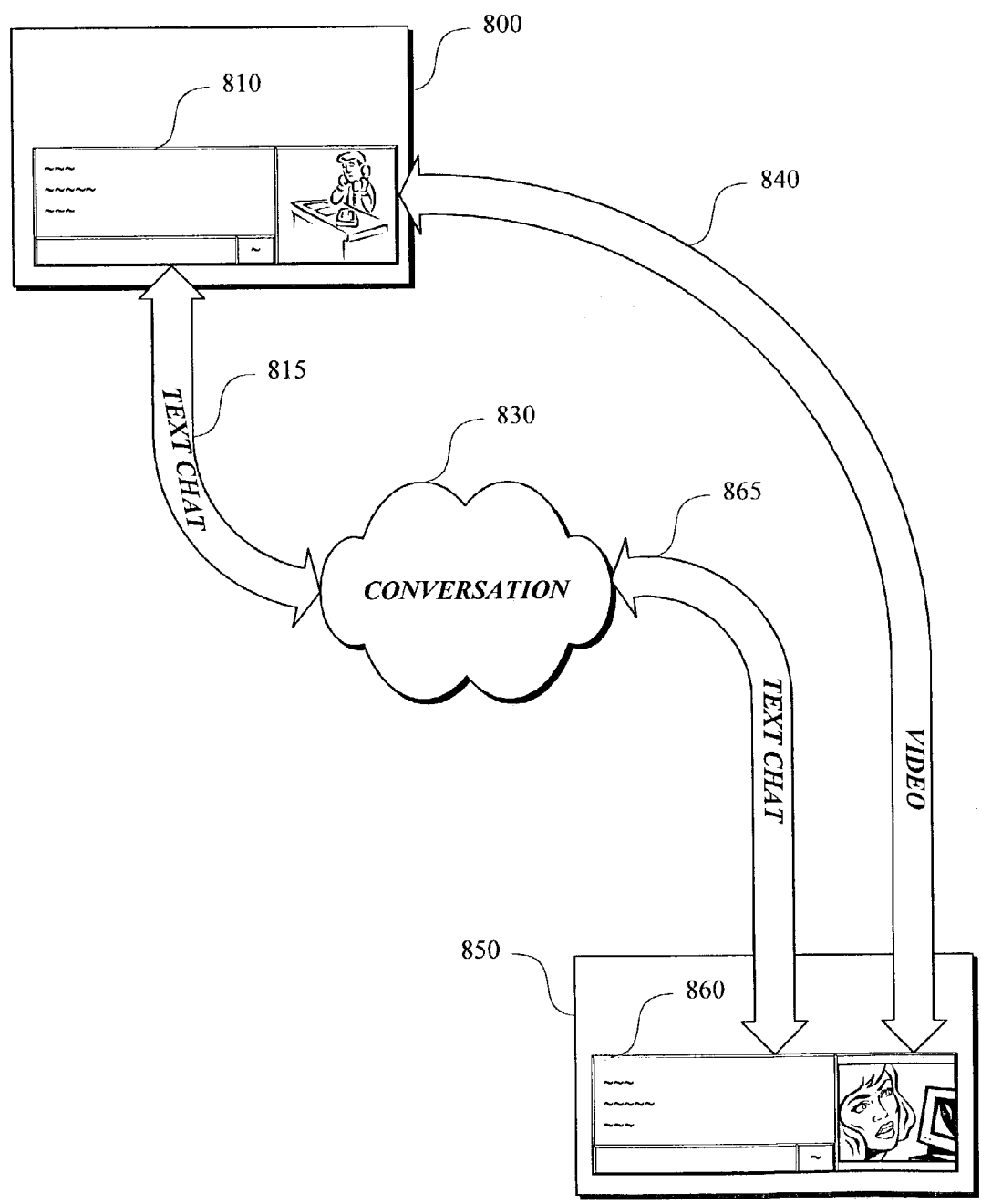
FIG. 8 is a simplified pictorial representation of communications between applications with embedded communications controls in accordance with the present invention.

FIG. 8 illustrates an exemplary diagram of two applications 800, 850 having a text chat and a video communication between communications controls 810 and 860 embedded in applications 800, 850. The text chat 815 of communications control 810 is a non-peer-to-peer text chat and accordingly connects to a conversation 830. Correspondingly, the communications control 860 of application 850 has a text chat 865 that also connects with the same conversation 830 as does text chat 815. Accordingly, application 800 and application 850 may communicate via text chat using the conversation 830. As described above, the conversation 830 may reside in a conversation store 125 on a client device 200, a communications device 150, a communication service provider 120, or other devices in communication with the communication network 100. Additionally, application 800 and application 850 include a video connection 840 that is a peer-to-peer connection. Therefore, the communications control 810 and communications control 860 have a direct peer-to-peer connection for a video communication 840 with no intermediary "conversation." Those of ordinary skill in the art and others will appreciate that FIG. 8 illustrates only one exemplary embodiment of applications and communications in accordance with the present invention. FIG. 8 in no way is meant to present an exhaustive listing of possible types of applications and/or communications.

More complex interactions with communications controls in accordance with the present invention are possible. For example, it is possible to maintain ongoing communications using communications controls that are moved between applications that have been adapted to utilize communications controls in accordance with the present invention. One example would be to remove a text chat from a word processing application and move it to a Web browser application. This would allow users to maintain communications without having to keep unnecessary applications open. Additionally, by having an active communications control at the application chosen by the user, better collaboration is possible. It is no longer necessary to switch between applications to communicate.

Figure 9:
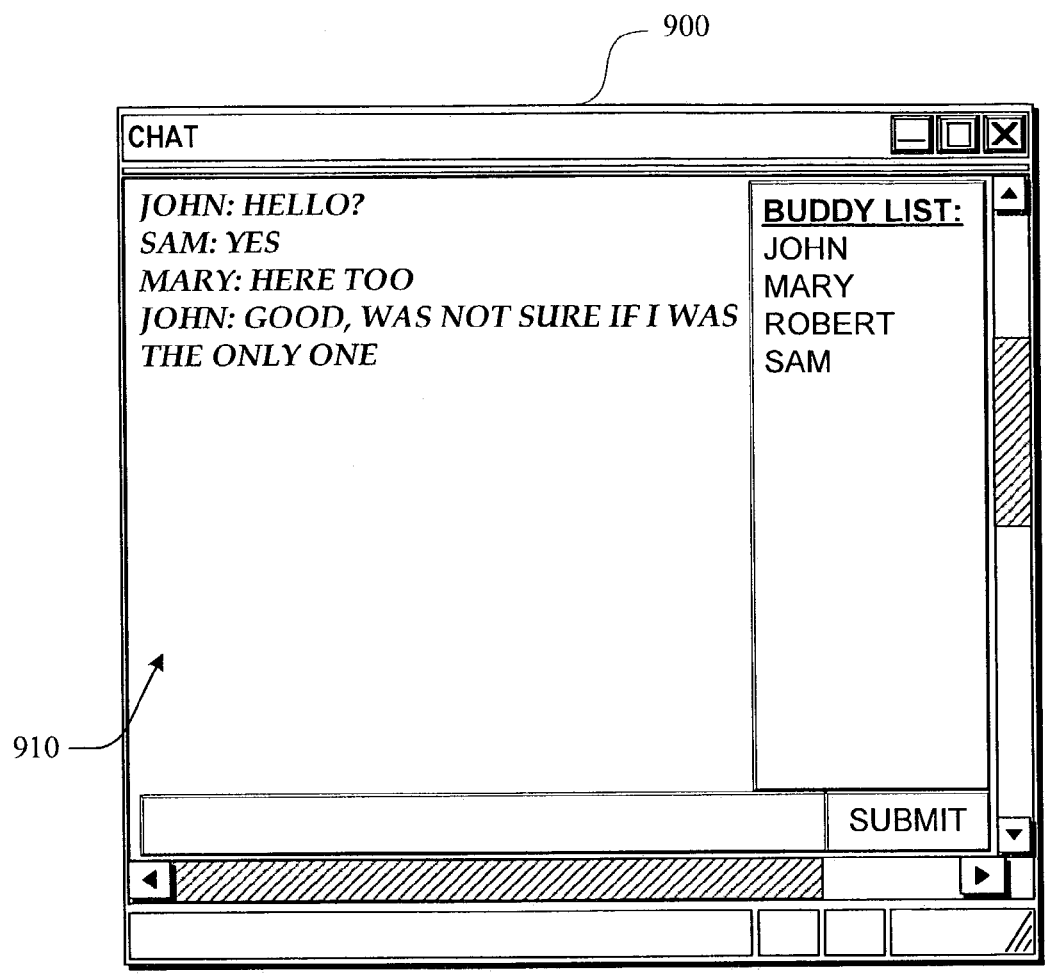
FIG. 9 shows an exemplary shell application for containing a communications control in accordance with the present invention.
Figure 10:
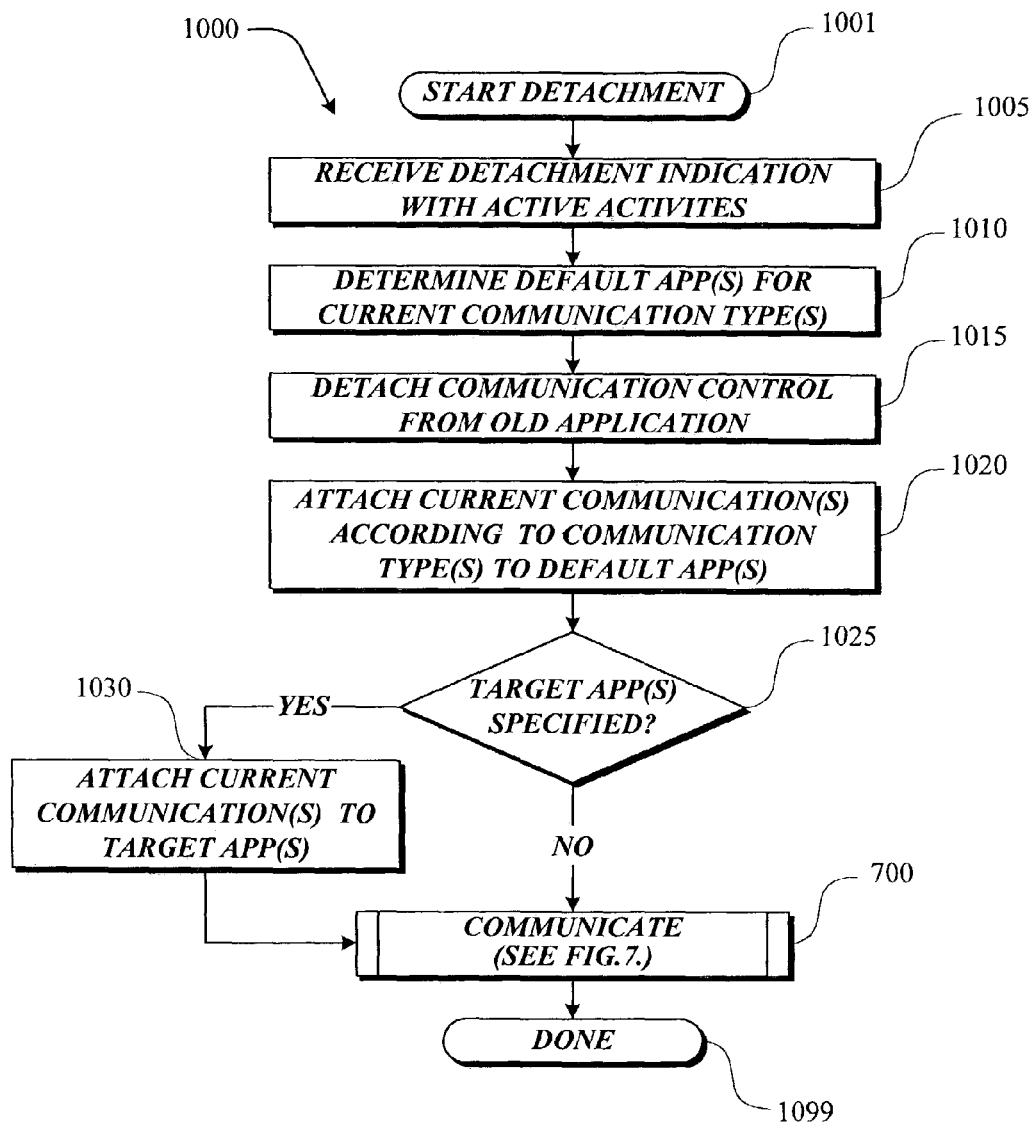
FIG. 10 is an overview flow diagram illustrating a communications control detachment routine in accordance with the present invention.
Figure 11:
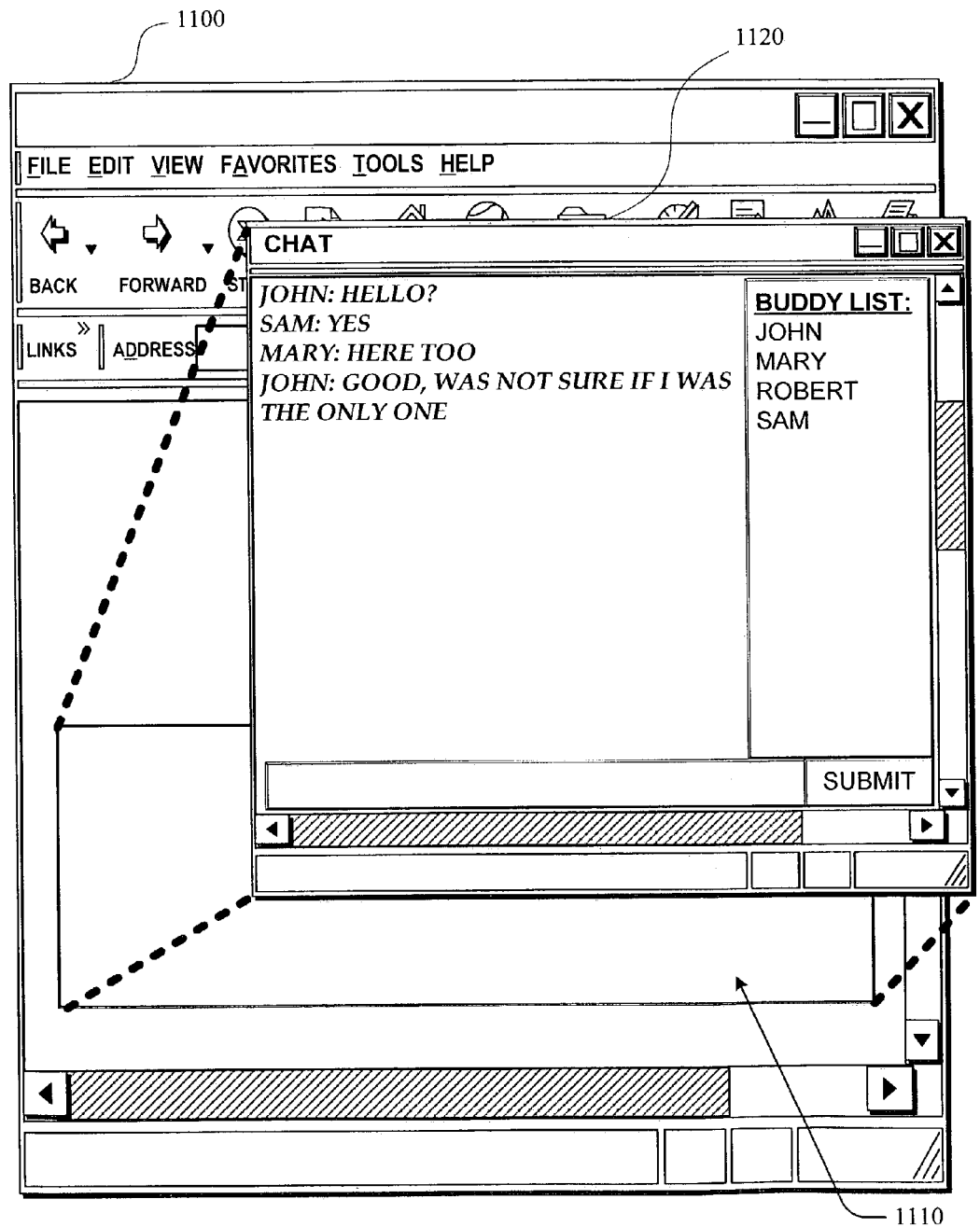
FIG. 11 shows an exemplary diagram of a communications control being detached from an application that had an embedded communications control in accordance with the present invention.

FIG. 10 illustrates a detachment routine 1000 for detaching a communications control from one application and either using it on its own within a default application such as a shell application 900, or reattaching the detached communications control to a target application. Detachment routine 1000 begins at block 1001 and proceeds to block 1005 where an indication to detach a communications control is received that includes the current activity or activities that are active. One exemplary indication to detach is when a user "drags" (clicks on a control and moves it) a control out of a window of an application. Those of ordinary skill in the art will appreciate that other indications to default may be used. Next in block 1010 a determination is made of the default application(s) for the current activity or activities. Next in block 1015 the current communications control is physically detached from its previous application. FIG. 9 shows an illustrative embodiment of a default shell application for containing a communications control in accordance with the present invention. The illustrative shell 900 shown in FIG. 9 includes a chat communications control 910 as its component to form a shell communications program. FIG. 11 illustrates an exemplary application 1100 with a communications control 1110 that has been detached into a default application 1120 such as the shell application 900. Detachment routine 1000 then continues to block 1020 where the communications control is attached to a default application, such as shell application 900. Next, in decision block 1025 a determination is made that whether a target application or applications was specified. If in decision block 1025 a determination was made that a target application or applications was specified then processing continues to block 1030 where the current communication or communications are attached (dragged) to a target application or applications. Those of ordinary skill in the art will appreciate that there may be a mix of communication types and that one or more communication type would attach to a target application and that one or more may remain attached to a default application. This, for example, would allow a floating video window that is a separate connection rather than an attached text chart window. In any case, whether or not a target application was found to be specified in decision block 1025, communication continues at subroutine block 700 described above. Detachment subroutine ends at block 1099 when communication subroutine 700 returns.

Those of ordinary skill in art and others will appreciate that the communication of subroutine 700 may be performed in a number of different manners. For example, when detaching from an existing application and attaching to another application, the communications control can either maintain the current connections, or simply remember how to reconnect to the current applications. This may vary depending on the communication type (e.g., some communication types may not be able to handle seamless disconnects and reconnects), the different types of client devices 200, and/or communications devices 150, or simply from the preferences that a user may configure with regard to their communications controls.

While illustrated embodiments of the invention have been illustrated and described, it will be appreciated that various changes can be made therein without departing from the spirit and scope of the invention.

The embodiments of the invention in which an exclusive property or privilege is claimed are defined as follows:

1. A method of utilizing a detachable communications control on a client computing device attached to a computing program on the client computing device to control communication between the client computing device and a communications device, the method comprising:
   utilizing the detachable communications control on the client computing device to determine from a contact's information an extensible communication activity;
   generating a communication request to a communication address of said extensible communication activity, wherein the communication request is received at the communications device, and wherein the communications device loads a program corresponding to the extensible communication activity in response to receiving the communication request;
   establishing and maintaining a bidirectional transmission communications connection conforming to said extensible communication activity between the client computing device and the communications device;
   detaching the detachable communications control on the client computing device from the computing program on the client computing device while maintaining the bidirectional transmission communication connection such that the computing program maintains the bidirectional transmission communication connection without utilization of the detachable communications control.

2. The method of claim 1, wherein the detachable communications control is provided by an operating system.

3. The method of claim 1, wherein said computing program is a shell program for said detachable communications control.

4. The method of claim 1, wherein said bidirectional transmission communications connection is selected from a group consisting of: text chats, instant messages, video streaming, and audio streams.

5. The method of claim 1, wherein said bidirectional transmission communications connection is over a computing network.

6. The method of claim 1, wherein said bidirectional transmission communications connection is over a telephone network.

7. The method of claim 1, wherein the communications device is a POTS telephone.

8. The method of claim 1, wherein establishing and maintaining a bidirectional transmission communications connection further comprises creating a conversation and both the communications device and the client computing device establishing and maintaining a connection via said conversation.

9. The method of claim 1, further comprising said computing program specifying said detachable communications control and extensible communication activities for use by the computing program.

10. The method of claim 9, wherein said computing program specifics extensible communication activities with an extensible markup language.

11. The method of claim 1, further comprising attaching the detached detachable communications control to a second computing program adapted to utilize the detachable communications control.

12. The method of claim 11, wherein detaching the detachable communications control and attaching it to the second computing program maintains said established bidirectional transmission communications connection.

13. The method of claim 1, wherein said extensible communication activity further comprises an indication of a specific communications program for responding to said communication request.

14. The method or claim 1, wherein said communication request comprises a plurality or concurrent communication activities, each activity specifying a communication type and wherein establishing and maintaining a bidirectional transmission communications connection includes establishing and maintaining a plurality of concurrent bidirectional transmission communications connections corresponding to each specified concurrent communication activity.

15. The method of claim 1, wherein establishing and maintaining a bidirectional transmission communications connection further comprises the communications device and the client computing device establishing and maintaining a peer-to-peer connection with each other.

16. A computer readable storage medium having computer executable instructions for utilizing a detachable communications control on a client computing device attached to a computing program on the client computing device to control communication between the client computing device and a communications device, by:
   utilizing the detachable communications control on the client computing device to determine from a contact's information an extensible communication activity;
   generating a communication request to a communication address of said extensible communication activity, wherein the communication request is received at the communications device, and wherein the communications device loads a program corresponding to the extensible communication activity in response to receiving the communication request;
   establishing and maintaining a bidirectional transmission communications connection conforming to said extensible communication activity with the communications device; and
   detaching the detachable communications control on the client computing device from the computing program on the client computing device while maintaining the bidirectional transmission communications connection such that the computing program maintains the bidirectional transmission communication connection without utilization of the detachable communications control.

17. The computer readable storage medium of claim 16, wherein the detachable communications control is provided by all operating system.

18. The computer readable storage medium of claim 16, wherein said communications connection is selected from the group consisting of: text chats, instant messages, video streaming, and audio streams.

19. The computer readable storage medium of claim 16, wherein establishing and maintaining a bidirectional transmission communications connection further comprises creating a conversation and both the remote communications device and the client computing device establishing and maintaining a connection via said conversation.

20. The computer readable storage medium of claim 16, further comprising said computing program specifying said detachable communications control and extensible communication activities for use by the computing program.

21. The computer readable storage medium of claim 20, wherein said computing program specifies extensible communication activities with an extensible markup language.

22. The computer readable storage medium of claim 16, wherein said extensible communication activity further comprises an indication of a specific communications program for responding to said communication request.

23. The computer readable storage medium or claim 16, wherein said communication request comprises a plurality of concurrent communication activities, each activity specifying a communication type and wherein establishing and maintaining a bidirectional transmission communications connection includes establishing and maintaining a plurality of concurrent bidirectional transmission communications connections corresponding to each specified concurrent communication activity.

24. The method of claim 16, wherein said communication request comprises a plurality of extensible communication activities and further comprising activating a plurality of communications programs in response to said plurality of extensible communication activities.

25. The method of claim 16, wherein said communication request comprises a plurality of extensible communication activities and further comprising activating only one said communications program in response to said plurality of extensible communication activities.

26. The computer readable storage medium of claim 16, wherein establishing and maintaining a bidirectional transmission communications connection further comprises the communications device and the client computing device establishing and maintaining a peer-to-peer connection with each other.

27. A computing apparatus having a processor and a memory, the memory having computer executable instructions for utilizing a detachable communications control on a client computing device attached to a computing program on the client computing device to control communication between the computing apparatus and a communications device by:

utilizing the detachable communications control on the client computing device to determine from a contact's information an extensible communication activity;

generating a communication request to a communication address of said extensible communication activity, wherein the communication request is received at the communications device, and wherein the communications device loads a program corresponding to the extensible communication activity in response to receiving the communication request;

establishing and maintaining a bidirectional transmission communications connection conforming to said extensible communication activity between the computing apparatus and the communications device; and detaching the detachable communications control on the client computing device from the computing program on the client computing device while maintaining the bidirectional transmission communications connection such that the computing program maintains the bidirectional transmission communication connection without utilization of the detachable communications control.

28. The computing apparatus of claim 27, wherein the detachable communications control is provided by an operating system.

29. The computing apparatus of claim 27, wherein said bidirectional transmission communications connection is selected from the group consisting of: text chats, instant messages, video streaming, and audio streams.

30. The computing apparatus of claim 27, wherein establishing and maintaining a bidirectional transmission communications connection further comprises creating a conversation and both the remote communications device and the client computing device establishing and maintaining a connection via said conversation.

31. The computing apparatus of claim 27, further comprising said computing program specifying said detachable communications control and extensible communication activities for use by the computing program.

32. The computing apparatus of claim 31, wherein said computing program specifies extensible communication activities with all extensible markup language.

33. The computing apparatus of claim 27, wherein said extensible communication activity further comprises an indication of a specific communications program for responding to said communication request.

34. The computing apparatus of claim 27, wherein said communication request comprises a plurality of concurrent communication activities, each activity specifying a communication type and wherein establishing and maintaining a bidirectional transmission communications connection includes establishing and maintaining a plurality of concurrent bidirectional transmission communications connections corresponding to each specified concurrent communication activity.

35. The computing apparatus of claim 27, wherein establishing and maintaining a bidirectional transmission communications connection further comprises the communications device and the client computing device establishing and maintaining a peer-to-peer connection with each other.

* * * * *